United States Patent
Hopkins et al.

(10) Patent No.: US 6,311,810 B1
(45) Date of Patent: Nov. 6, 2001

(54) MAGNETORHEOLOGICAL FLUID DAMPER

(75) Inventors: Patrick Neil Hopkins, West Carollton, OH (US); John David Fehring, Churubusco, IN (US); Ilya Lisenker, Miamisburg, OH (US); Richard Edward Longhouse, Dayton, OH (US); William Charles Kruckemeyer, Beavercreek, OH (US); Michael Leslie Oliver, Xenia, OH (US); Frank M. Robinson, Centerville, OH (US); Alexander Apostolos Alexandridis, Kronberg (DE)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/422,453

(22) Filed: Oct. 21, 1999

(51) Int. Cl.⁷ ........................................................ F16F 9/53
(52) U.S. Cl. ................................... 188/267.2; 188/322.22
(58) Field of Search ........................... 188/267.2, 322.15, 188/322.22, 282.6, 265, 316, 267.1

(56) References Cited

U.S. PATENT DOCUMENTS

| | | |
|---|---|---|
| 2,661,596 | 12/1953 | Winslow . |
| 3,133,615 * | 5/1964 | Edman et al. ........................ 137/488 |
| 3,198,293 * | 8/1965 | Mathews .............................. 188/163 |
| 3,207,269 | 9/1965 | Klass . |
| 3,812,936 * | 5/1974 | Dane ..................................... 188/171 |
| 4,214,795 * | 7/1980 | Kakuminato ............................ 303/89 |
| 4,454,934 * | 6/1984 | Deveney et al. ...................... 188/171 |
| 4,515,282 * | 5/1985 | Hidaka et al. ........................ 188/282 |
| 4,530,422 * | 7/1985 | Bogenschutz ............................ 188/52 |
| 5,014,829 * | 5/1991 | Hare, Sr. ............................... 188/267 |
| 5,277,281 | 1/1994 | Carlson et al. . |
| 5,566,796 * | 10/1996 | De Kock ............................... 188/299 |
| 5,632,361 | 5/1997 | Wulff et al. . |
| 5,706,919 * | 1/1998 | Kruckemeyer et al. ............. 188/299 |
| 5,752,750 * | 5/1998 | Lubischer et al. ................ 303/199.2 |
| 5,848,678 * | 12/1998 | Johnston et al. ..................... 192/21.5 |
| 5,878,851 | 3/1999 | Carlson et al. . |

FOREIGN PATENT DOCUMENTS

98/00653    1/1998   (WO) .

OTHER PUBLICATIONS

"Magentortheological Effect As A Base Of New Devices and Technologies", W.I. Kordonsky, Journal of Magnetism Materials, 122 (1993) 395–398.

"MagneShock™ Scores First Race Win", Carrera Racing Shocks, Jun. 1999.

* cited by examiner

Primary Examiner—Douglas C. Butler
Assistant Examiner—Xuan Lan Nguyen
(74) Attorney, Agent, or Firm—Robert M. Sigler

(57) ABSTRACT

A novel and improved magnetorheological fluid damper is provided which effectively secures a flux ring to a piston core in a manner which prevents relative axial and radial movement between the flux ring and the core throughout operation while minimizing the size of the piston assembly yet providing effective damping. Several connector devices are disclosed for both axially and radially securing the flux ring relative to the piston core at one end of the piston assembly in a simple manner without increasing the length of the piston assembly. The connector device may include an outer portion brazed to the flux ring, an inner portion connected to the piston core, bridge portions extending between the outer and inner portions, flow passages formed between the bridge portions and an inlet cavity formed adjacent an annular flow gap to permit unimpeded, enhanced laminar flow through the flow gap by improving the damping effect. Other connector devices may include elongated rivets extending through the flow gap axially along the piston assembly, and elongated pin and spacer tube connectors extending radially between the piston core and the flux ring. Various embodiments of radial support devices are disclosed for possible use in combination with the connector devices to enhance radial support by, for example, the use of balls, a washer with tabs, a coil bobbin with tabs, rivets and axially extending elongated pins.

1 Claim, 6 Drawing Sheets

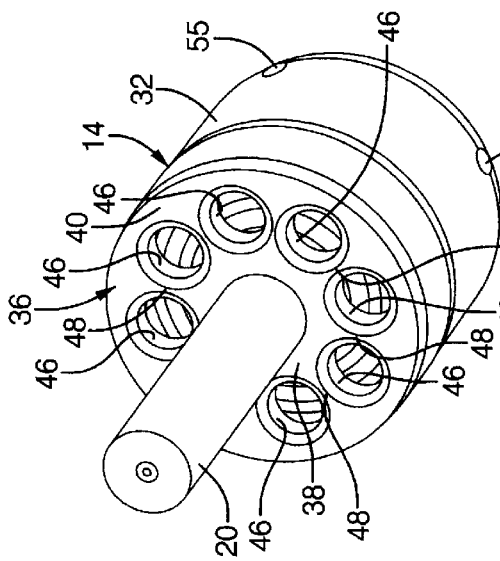
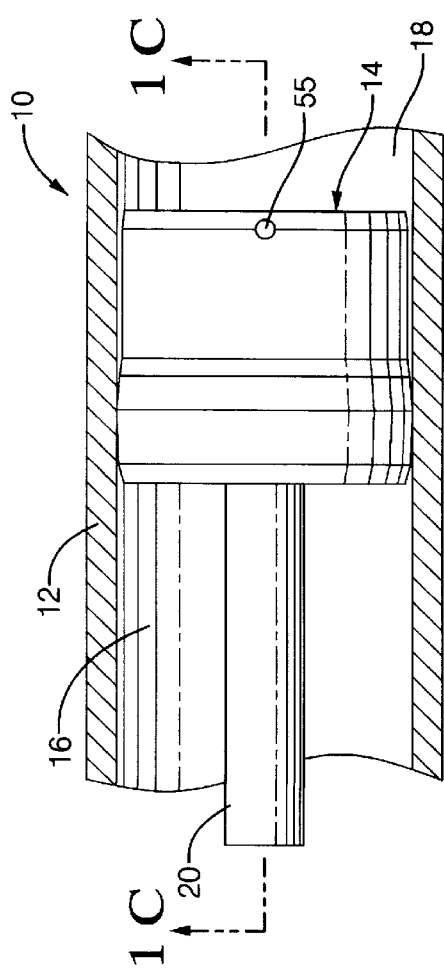
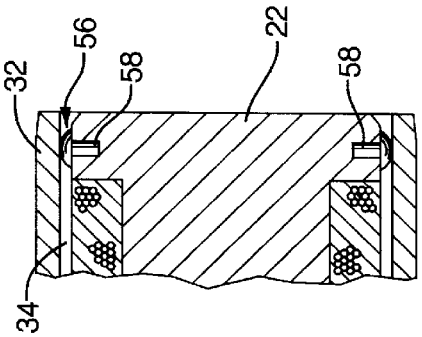
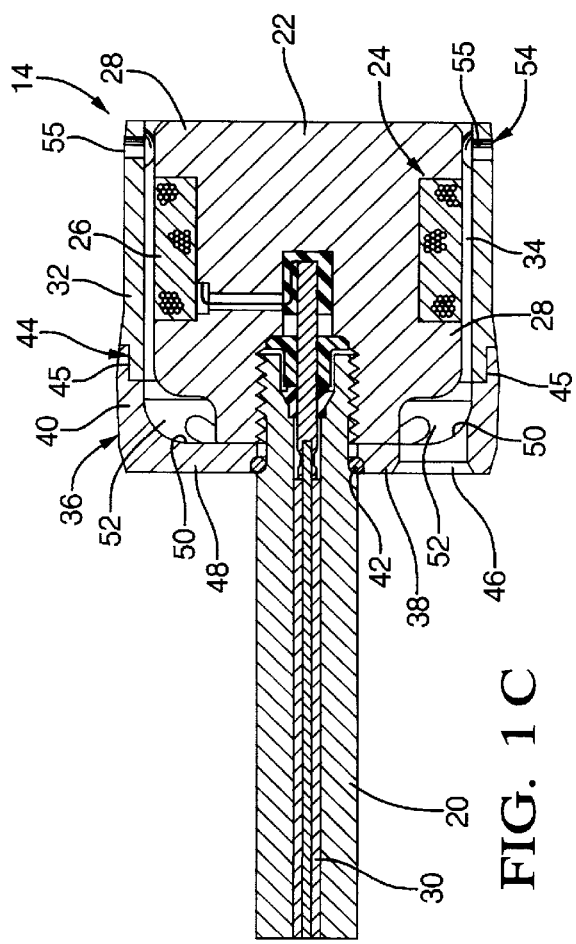
FIG. 1A
FIG. 1B
FIG. 1C
FIG. 2

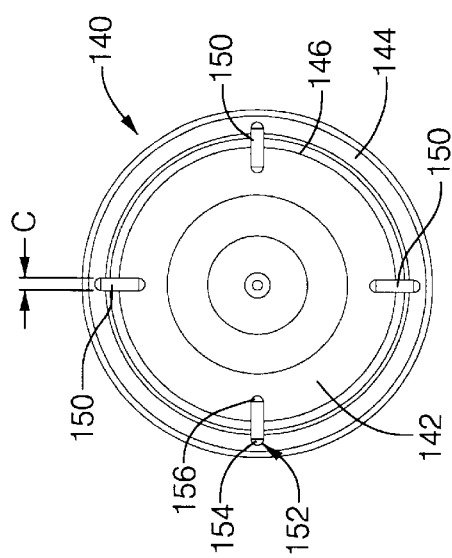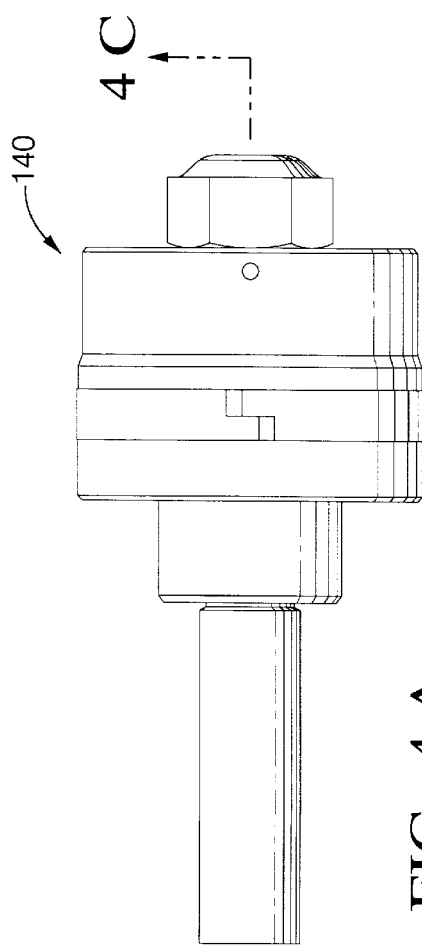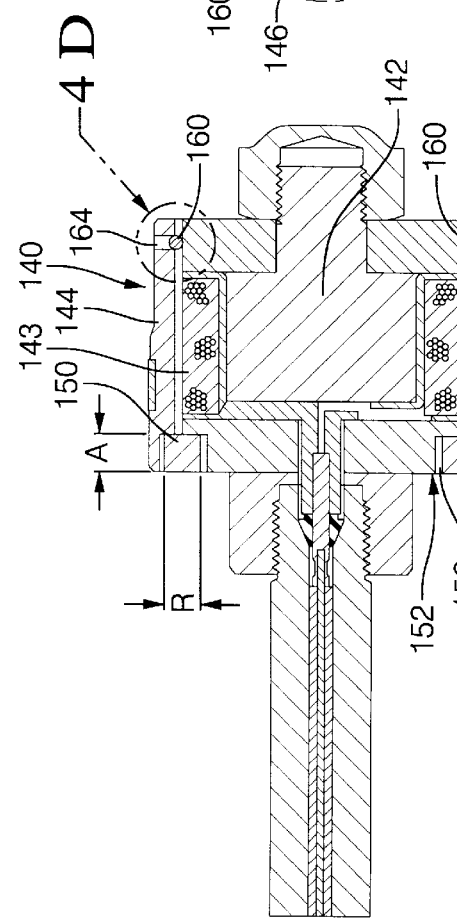

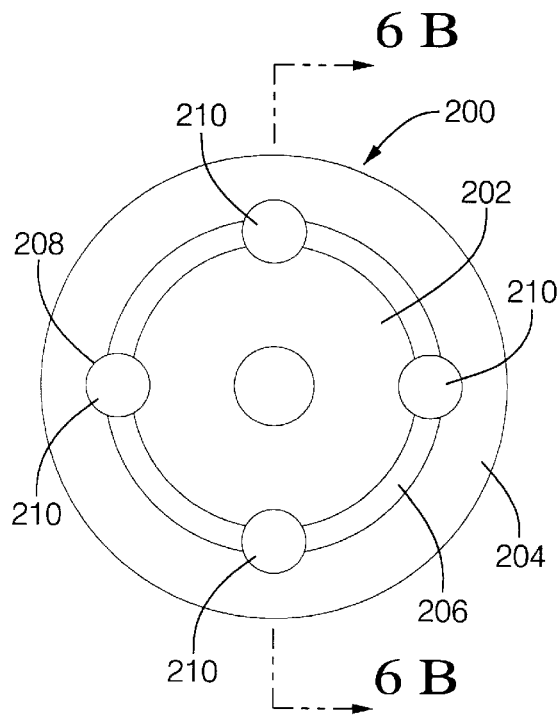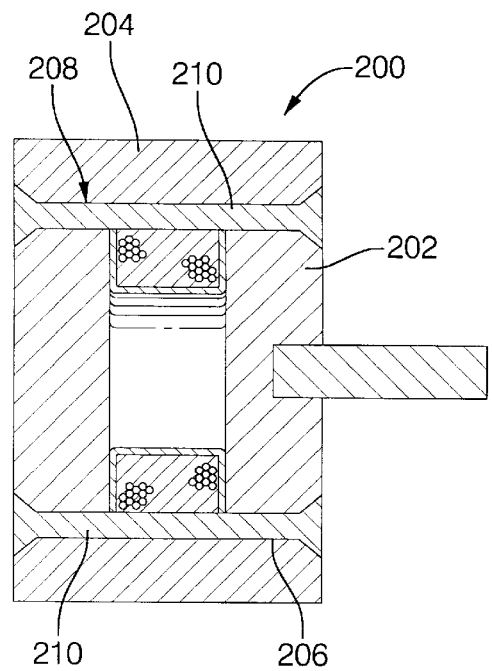
FIG. 6 A                FIG. 6 B
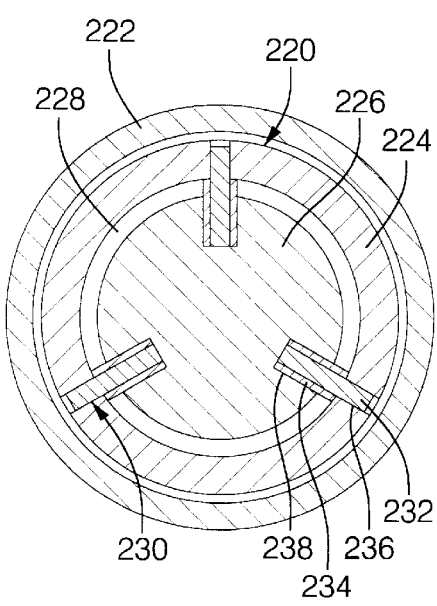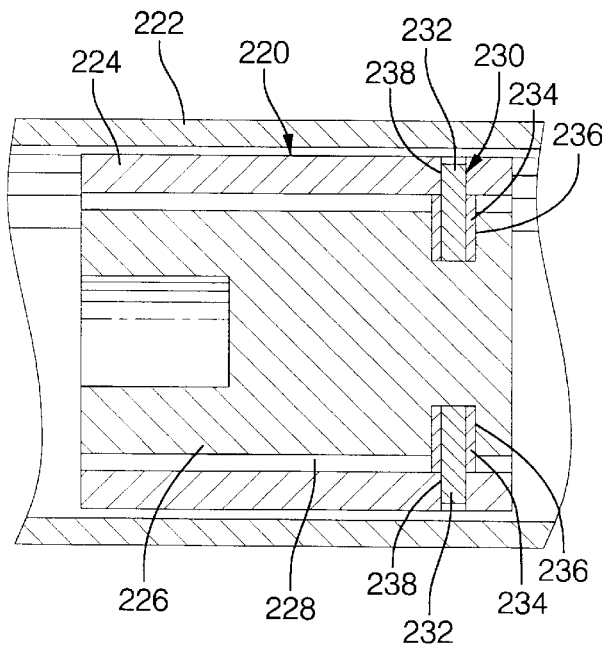
FIG. 7 A                FIG. 7 B

MAGNETORHEOLOGICAL FLUID DAMPER

TECHNICAL FIELD

The present invention relates to a magnetorheological fluid damper and more particularly, to a linear acting fluid damper for a vehicle suspension employing magnetic tuning in connection with a magnetorheological working fluid to effect desired damping levels.

BACKGROUND OF THE INVENTION

Magnetorheological fluids that comprise suspensions of magnetic particles such as iron or iron alloys in a fluid medium are well known. The flow characteristics of these fluids can change by several orders of magnitude within milliseconds when subjected to a suitable magnetic field due to suspension of the particles. The ferromagnetic particles remain suspended under the influence of magnetic fields and applied forces. Such magnetorheological fluids have been found to have desirable electromagnetomechanical interactive properties for advantageous use in a variety of magnetorheological (MR) damping devices, such as rotary devices including brakes and clutches, and linear-acting devices for damping linear motion or for providing controllable dissipative forces along the damper's axis.

In particular, linear acting MR dampers are commonly used in suspension systems, such as a vehicle suspension system and vehicle engine mounts. PCT patent application 10840, published Jan. 8, 1998 (the '840 application), discloses a conventional linear acting controllable vibration damper apparatus which includes a piston positioned in a magnetorheological fluid-filled chamber to form upper and lower chambers. The piston includes a coil assembly, a core, i.e. pole pieces, and an annular ring element positioned around the pole pieces to form an annular flow passage for permitting flow of the magnetorheological fluid between the chambers. When the piston is displaced, magnetorheological fluid is forced through the annular flow passage. When the coil is energized, a magnetic field permeates the channel and excites a transformation of the magnetorheological fluid to a state that exhibits damping forces.

In damper designs utilizing an annular flow passage, the radial width of the annular flow passage must be precisely set and maintained along the axial length of the passage throughout operation to ensure optimum, predictable control of the damping performance. The '840 application discloses the use of a plurality of bridge elements interconnecting the pole piece and the annular ring element. The bridge elements may include circumferentially spaced welds formed of nonmagnetic material. Also, each bridge may include a nonmagnetic pin to further locate and retain the pole relative to the ring. In another embodiment, the pole and ring are connected using a nonmagnetic plate positioned at one end of the assembly. The plate includes radially extending tabs forming bridging elements positioned outside and immediately adjacent the annular passage so as to extend across one end of the annular passage. The plate is secured to the pole piece and the ring by spot welds.

However, the means for connecting the ring and pole piece of the damper disclosed in the '840 application may result in specific disadvantages. For example, the plate tabs and welds are undesirably positioned immediately adjacent one end of the annular flow gap and, therefore, necessarily block fluid flow into the gap along the extent of the tabs and welds thereby disadvantageously reducing the effective shearing surface area of the damper resulting in a reduction in the MR effect. Also, the welds, pins and radial tabs of the plate each include blunt surfaces exposed to the fluid flow that undesirably impede the flow and increase uncontrollable drag forces which lead to a reduction in turn-up ratio performance of the assembly. In addition, both the welds and the plate extend beyond the axial extent of the piston thereby adding to the length of the piston and resulting in an undesirably large and costly assembly possibly incapable of meeting the packaging constraints of a particular application.

Therefore, there is a need for a more compact, less costly MR damper capable of effectively and controllably damping motion.

SUMMARY OF THE INVENTION

It is an object of the present invention, therefore, to overcome the disadvantages of the prior art and to provide a magnetorheological (MR) fluid damper which effectively maintains axial and radial alignment between a flux ring and a piston core while effectively and predictably providing a desired damping effect and minimizing the size and cost of the damper.

This and other objects of the present invention are achieved by providing a damper comprising a cylinder containing a magnetorheological fluid and a piston assembly mounted for reciprocal movement in the cylinder to form a first chamber positioned on one side of the piston assembly and a second chamber positioned on an opposite side of the piston assembly. The piston assembly includes a piston core, a magnet assembly adapted to generate a magnetic field and including a flux ring, and a flow gap extending axially between the first and the second chambers and positioned radially between the core and the flux ring. The piston assembly further includes a connector device formed of a nonmagnetic material including an inner portion connected to the piston core, an outer portion connected to the flux ring and flow passages positioned radially between the outer portion and the inner portion and extending axially to allow fluidic communication between the flow gap and the first chamber. The outer portion includes an abutment surface positioned in abutment with the flux ring while the abutment surface extends annularly along a substantial portion of a circumference of the flux ring. The inner portion may be connected to the piston core by axial compressive forces or by a welded or brazed connection. The outer portion may also be connected to the flux ring by a welded or brazed connection. The connector device may further include at least one bridge portion connecting the inner and the outer portions wherein the bridge portion is positioned a spaced axial distance from the flow gap to form an inlet cavity providing unobstructed fluid flow to the flow gap. The damper may further include a radial support device positioned within the flow gap for radially supporting the flux ring relative to the piston core. The radial support device is preferably positioned entirely within the axial extent of the piston assembly. The radial support device may include rivets secured to one of the flux ring and the piston core wherein the rivets extend radially through the flow gap. The radial support device may include a plurality of balls positioned in the flow gap. A plurality of annular ball seats may be provided on one of the flux ring and the piston core wherein each ball seat is sized to engage a respective ball and prevent axial movement of the ball. The radial support device may further include an aperture formed in the flux ring wherein the ball seat is formed at one end of the aperture. The magnet assembly may include a bobbin and a coil mounted on the bobbin. The radial support device may include tabs integrally formed on the bobbin and positioned in the flow gap. Alternatively, the radial support device may include a washer positioned axially adjacent the coil and including tabs extending into the flow gap. The radial support device may alternatively include elongated pins bonded to the core. The elongated pins may include a rectangular cross section bonded to the piston core by a brazed connection.

The present invention is also directed to a damper comprising a cylinder containing a magnetorheological fluid in a piston assembly mounted for reciprocal movement in the cylinder to form a first chamber positioned on one side of the piston assembly and a second chamber positioned on an opposite side of the piston assembly wherein the piston assembly includes a piston core, a magnet assembly adapted to generate a magnetic field and including a flux ring, and an annular flow gap extending axially between the first and the second chambers and positioned radially between the piston core and the flux ring. At least one of the piston and the flux ring define an outer axial extent of the piston assembly. A plurality of connectors are connected to the flux ring and the piston core to axially and radially secure the flux ring relative to the piston core. Each of the plurality of connectors is positioned within the axial extent of the piston assembly. Each of the plurality of connectors may include a flat blade. A radial support device may be positioned in the annular flow gap for contacting the flux ring and the piston core. The radial support device may include rivets secured to one of the flux ring and the piston core wherein the rivets extend radially through the annular flow gap. The radial support device may alternatively include a plurality of balls positioned in the flow gap. The radial support device may further include the aperture and ball seat discussed hereinabove. Alternatively, the radial support device may include the integral tabs formed on a bobbin and/or the washer with tabs and/or the elongated pins extending axially along the piston assembly as discussed hereinabove. Each of the plurality of connectors may include an elongated pin having a longitudinal axis extending radially from the piston core through the annular flow gap to the flux ring. The elongated pin may be positioned within bores formed in the flux ring and the piston core. Each of the plurality of connectors may further include a spacer tube receiving the elongated pin wherein one end of the spacer tube is positioned in the bore formed in the piston core and an opposite end of the spacer tube is positioned in abutment with the flux ring. Alternatively, each of the plurality of connectors may include a rivet having a longitudinal axis extending axially along the piston assembly.

The present invention is also directed to a damper including a plurality of flat blades connected to the flux ring and the piston core to axially and radially secure the flux ring relative to the piston core. Each of the plurality of flat blades includes an axial extent, a radial extent and a circumferential gap extent wherein the circumferential gap extent is less than the axial and the radial extents. The flux ring may include a first connector groove while the piston. core includes a second connector groove positioned opposite the first connector groove to form a connector slot. Each of the plurality of flat blades is positioned within a respective connector slot. Each of the plurality of flat blades may be connected to the flux ring and the piston core by one of a welded connection and a brazed connection. The damper may further include a radial support device positioned in the annular flow gap and contacting the flux ring and the piston core.

Thus, the present invention is also directed to a damper comprising a connector device positioned adjacent one end of the piston assembly for securing the flux ring to the piston core to prevent relative radial and axial movement between the flux ring and the piston core, and a radial support device positioned a spaced axial distance along the piston assembly from the connector device for maintaining the annular flow gap by radially supporting the flux ring.

BRIEF DESCRIPTION OF THE DRAWINGS

FIG. 1A is a side view of one embodiment of the MR damper of the present invention;

FIG. 1B is a perspective view of the piston assembly of the MR damper of FIG. 1A;

FIG. 1C is a cross sectional view of the piston assembly of FIG. 1B;

FIG. 2 is a second embodiment of the radial support device of the present invention;

FIG. 4A is a side view of an alternative embodiment of the piston assembly of the present invention;

FIG. 4B is an end view of the piston assembly of FIG. 4A showing an alternative connector device including flat blades;

FIG. 4C is a cross sectional view of the damper assembly of FIG. 4A;

FIG. 4D is an expanded view of area A in FIG. 4C showing One embodiment of a radial support device;

FIG. 5 is an expanded cross sectional view of the present piston assembly illustrating an alternative embodiment of the radial support device of FIG. 4D;

FIG. 6A is a rod-end view of a piston assembly of the present invention showing another embodiment of a connector device providing axial and radial support to the flux ring;

FIG. 6B is a cross sectional view of the piston assembly of FIG. 6A taken along plane 6B—6B;

FIG. 7A is a cross sectional view of another embodiment of the damper of the present invention showing an alternative connector device for providing axial and radial alignment of the flux ring;

FIG. 7B is a longitudinal cross sectional view of the assembly of FIG. 7A taken along plane 7B—7B;

DETAILED DESCRIPTION OF THE INVENTION

Figure 3A:
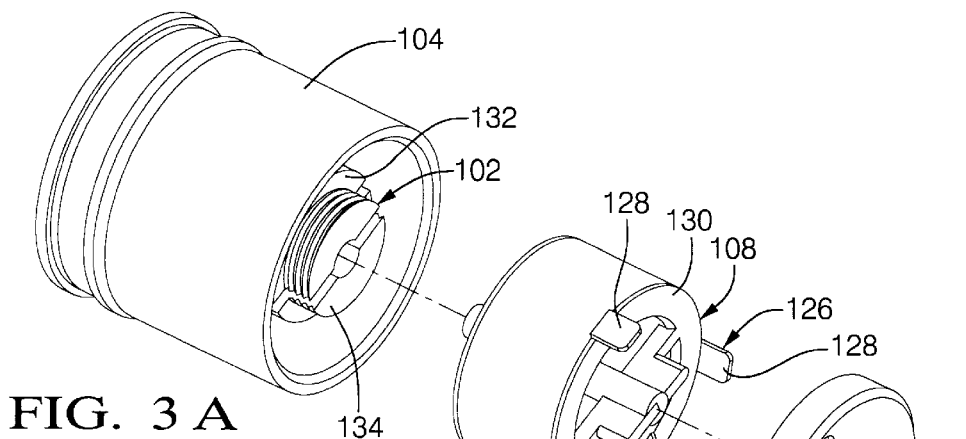
FIG. 3A is an exploded view of an alternative embodiment of the piston assembly of the present invention showing an alternative embodiment of a connector device and a radial support device.

Referring to FIGS. 1A–1C, there is shown the magnetorheological fluid damper of the present invention, indicated generally at 10, designed to effectively maintain secure axial and radial alignment of the piston assembly components throughout operation to permit effective damping while minimizing damper costs and size. The MR damper 10 includes a cylinder 12 containing magnetorheological fluid and a piston assembly 14 mounted for reciprocal movement in cylinder 12 to form a first chamber 16 positioned on one side of piston assembly 14 and a second chamber 18 positioned within cylinder 12 on an opposite side of piston assembly 14.

Piston assembly 14 includes a cylindrical rod 20 and a piston core 22 mounted on one end of rod 20 and formed of a magnetic material. Piston assembly 14 further includes a magnet assembly 24 including a coil 26 mounted on piston core 22 to form flux pole pieces 28 positioned on each axial side of coil 26. Coil 26 is connected to an electrical source (not shown) via an electrical connector 30 extending through rod 20. Magnet assembly 24 also includes an annular flux ring 32 positioned around piston core 22 to form an annular flow gap 34 between the inner annular surface of flux ring 32 and the outer surface of piston core 22 and coil 26.

Fundamentally, during damping, magnetorheological fluid present in one of the chambers of cylinder 12 flows through flow gap 34 from, for example, second chamber 18 to first chamber 16 as piston assembly 14 moves to the right as shown in FIG. 1A. Flux ring 32 is designed with an outer diameter size to form a sliding fluid seal with the inner surface of cylinder 12 so as to permit relative sliding movement while avoiding significant leakage at the interface. The magnctorheological fluid within cylinder 12 may be any conventional fluid including magnetic particles such as iron or iron alloys which can be controllably suspended within the fluid by controlling a magnetic field thereby varying the flow characteristics of the fluid through flow gap 34. The electrical current to coil 26 is varied to vary the magnetic field thereby controlling the flow characteristics of the magnetorheological fluid to achieve a desired damping effect for a given application.

Importantly, damper 10 of the present invention as shown in FIGS. 1B and 1C also includes a connector device 36 for securing flux ring 32 to piston core 22 to prevent relative radial and axial movement between flux ring 32 and piston core 22 thereby permitting effective assembling of the components while maintaining a desired radial width of annular flow gap 34 to achieve effective and predictable damping operation. In the present embodiment, connector device 36 is positioned adjacent rod 20 at one end of piston assembly 14. Connector device 36 is formed of a nonmagnetic material and includes an inner portion 38 positioned adjacent rod 20 and piston core 22 and an outer portion 40 positioned radially outward from inner portion 38 and connected to flux ring 32. Inner portion 38 is positioned in compressive axial abutment between piston core 22 and rod 20. Specifically, rod 20 is threadably attached to piston core 22 so as to compress inner portion 38 between one end of piston core 22 and either a hog-ring 42 positioned in a groove formed on rod 20 or alternatively directly against a step formed on rod 20. Alternatively, inner portion 38 may be brazed or welded to piston core 22. Thus, connector device 36 is securably connected to the piston core 22 and rod 20. Outer portion 40 of connector device 36 is securably connected to flux ring 32 by welding or brazing to form a welded or brazed connection 44. Outer portion 40 and flux ring 32 both include opposing and overlapping abutment surfaces 45 extending annularly around substantially the entire circumference of the outer portion and flux ring for permitting an effective brazed or welded connection and optimum support. In this manner, flux ring 32 is effectively securably mounted on piston core 22 in a fixed axial and radial position so as to prevent axial and radial movement of flux ring 32 relative to piston core 22 throughout operation.

Referring to FIGS. 1B and 1C, connector device 36 also includes flow passages 46 positioned radially between outer portion 40 and inner portion 38 and extending axially through connector device 36 to allow fluidic communication between flow gap 34 and first chamber 16. Outer portion 40 and inner portion 38 are connected by bridge portions 48 extending radially outwardly between flow passages 46. Importantly, each bridge portion 48 includes an inner surface 50 positioned a spaced axial distance from flow gap 34 while outer portion 40 extends axially away from inner surface 50 to form an inlet cavity 52. Inlet cavity 52 extends annularly to provide unobstructed fluid flow to and from one end of flow gap 34. Thus, fluid flow into and out of flow gap 34 adjacent connector device 36 is not impeded by a connector structure extending across the inlet/outlet end of flow gap 34 since connector device 36 is formed with a cup-like shape positioning bridge portions 48 a spaced axial distance from flow gap 34 while forming inlet cavity 52 annularly around the entire circumference of the inlet/outlet of flow gap 34. Consequently, connector device 36 results in improved damping performance by effectively maintaining a desired radial width of flow gap 34 and by providing unobstructed, less turbulent fluid flow through flow gap 34.

MR damper 10 may further include a radial support device 54 positioned at an opposite end of piston assembly 14 for assisting and maintaining radial alignment between piston core 22 and flux ring 32 at the unsupported end of flux ring 32 opposite connector device 36. In the embodiment shown in FIG. 1C, radial support device 54 includes a plurality of rivets 55 secured to flux ring 32 and evenly spaced around the circumference of flux ring 32. Each rivet 55 extends radially inwardly from the inner surface of flux ring 32 a predetermined distance approximately equal to the desired radial width of flow gap 34. As a result, upon assembly, the inner portion of each rivet 55 is positioned in abutment against the outer surface of piston core 22 so as to prevent flux ring 32 from moving or compressing radially inwardly thereby maintaining the radial width of flow gap 34. It should be noted that radial Support device 54 may not be required in all applications as connector device 36 may be sufficient to provide both axial and radial support to flux ring 32.

FIG. 2 illustrates an alternative embodiment of a radial support device 56 similar to the previous device except that a plurality of rivets 58 are connected to piston core 22 instead of flux ring 32. Therefore, rivets 58 function the same as rivets 55 of the previous embodiment in maintaining radial alignment between piston core 22 and flux ring 32 to prevent a decrease in the radial width of flow gap 34. Thus, the combination of connector device 36 and rivets 55 or 58 function to maintain a concentric flow gap along the entire axial length of the gap. Also, the rivets 55, 58 are positioned within the axial extent of the piston assembly thereby minimizing the length of the piston assembly.

Figure 3B:
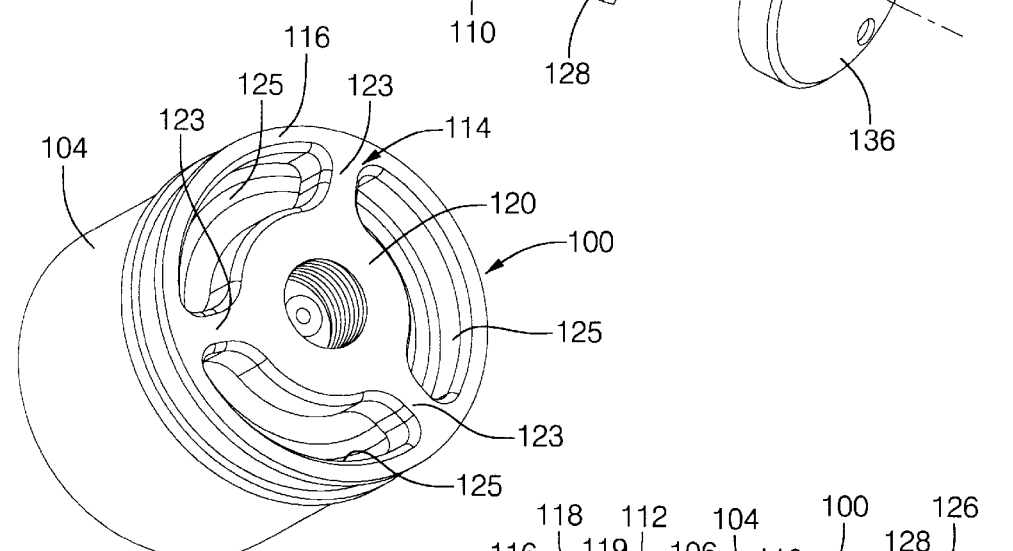
FIG. 3B is a perspective view showing the connector device of the piston assembly of FIG. 3A.
Figure 3C:
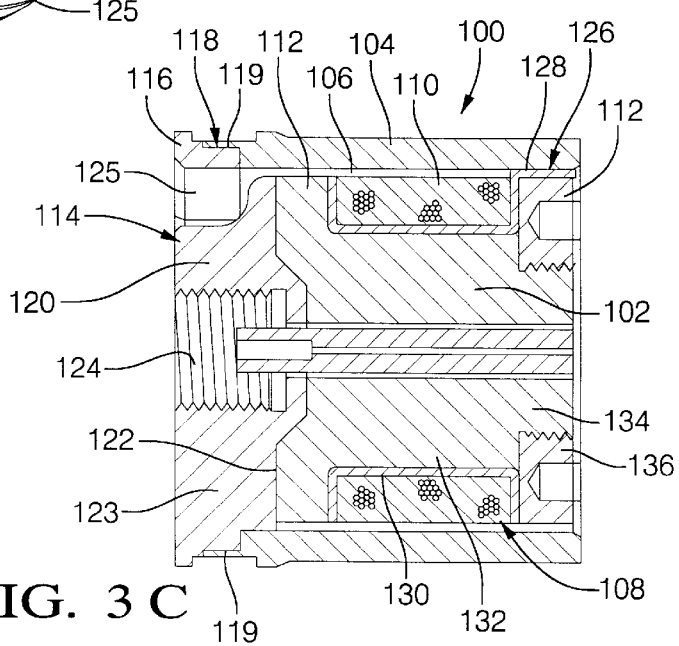
FIG. 3C is a cross sectional view of the piston assembly of FIG. 3B.

Referring to FIGS. 3A–3C, another embodiment of the MR damper of the present invention is shown which includes a piston assembly 100 including a piston core 102 surrounded by a flux ring 104 to form an annular flow gap 106. Similar to the previous embodiment, a magnet assembly 108 includes a coil 110 positioned between flux pole pieces 112. In this manner, magnet assembly 108, including flux ring 104, functions to generate a magnetic field across annular flow gap 106 so as to create and variably modify the MR effect on fluid flowing through flow gap 106. Also, similar to the previous embodiment, a connector piece 114 is utilized to secure flux ring 104 to piston core 102. Connector piece 114 includes an outer portion 116 rigidly connected to flux ring, 104 by brazing or welding to form a brazed or welded connection 118. Outer portion 116 and flux ring 104 both include opposing and overlapping abutment surfaces 119 extending annularly around substantially the entire circumference of the outer portion and the flux ring for permitting an effective brazed or welded connection and optimum support. However, unlike the previous embodiment connector piece 114 includes an inner portion 120 connected to piston core 102 also by welding or brazing to form an inner welded or brazed connection 122. Also, connector piece 114 has an axial length sufficient to contain a threaded bore 124 for engaging a rod. As with the previous embodiment, connector piece 114 is preferably formed of a non-magnetic material.

Piston assembly 100 may also include a radial support device 126 including tabs 128 integrally formed on a bobbin 130. Bobbin 130 permits coil 110 to be effectively wound prior to mounting on piston core 102. Piston core 102 includes a first part 132 having a cylindrical end 134 containing threads and a second part 136 for threadably engaging end 134 to connect to first part 132 as shown in FIG. 3C. Therefore, once bobbin 130 and coil 110 have been positioned on first part 132, second part 136 is threadably attached to secure the coil and bobbin in place. Importantly, tabs 128 are integrally formed on bobbin 130 so as to extend axially along the outer surface of piston core 102. Tabs 128 are spaced evenly around the circumference of piston assembly 100 and formed with a radial width equal to the desired radial width of gap 106 thereby maintaining a concentric gap. Although tabs 128 are shown to include three evenly spaced tabs, any number of tabs may be used. The tabs are importantly positioned within the axial extent of the piston assembly to avoid lengthening the assembly. It should be noted that connector piece 114 also includes bridge portions 123 for connecting outer portion 116 and inner portion 120. Bridge portions 123 are separated by flow openings 125 for permitting fluid flow to and from annular flow gap 106.

FIGS. 4A–4D disclose another embodiment of the MR damper of the present invention including a piston assembly 140 generally including a piston core 142, a magnetic flux generating coil 143 and a flux ring 144 positioned concentrically around piston core 142 to form an annular flow gap 146. Importantly, the damper of the present embodiment also includes a plurality of connectors 148 connected to both flux ring 144 and piston core 142 so as to axially and radially secure flux ring 144 relative to piston core 142. The plurality of connectors 148 includes four flat blades 150 evenly spaced around the circumference of piston assembly 140. Each flat blade 150 is positioned in a respective connector slot 152 formed by a first connector groove 154 formed in the inner surface of flux ring 144 and an opposing second connector groove 156 formed in the outer surface of piston core 142. Flat blades 150 are preferably formed from a non-magnetic material, such as stainless steel, so as not to interfere with the magnetic flux. Flat blades 150 are brazed or welded to flux ring 144 and to piston core 142 to form a secure connection for supporting flux ring 144 concentrically around piston core 142 thereby maintaining the radial width of annular flow gap 146. The brazing operation may be formed in a fixture positioned in a furnace to assure that the flux ring and piston core are concentric.

Flat blades 150 are specifically designed to create a secure connection for structural integrity when subjected to forces throughout operation while also minimizing any adverse effect on the flow of fluid into and out of annular flow gap 146. Specifically, each flat blade 150 includes a circumferential extent C, as shown in FIG. 4B, which is minimal to ensure unobstructed flow into and out of annular gap 146. Also, each flat blade 150 includes an axial extent A and a radial extent R each having a significant dimension for ensuring a secure connection and structural integrity throughout operation when subjected to substantial damping forces. Circumferential extent C is substantially less than each of the radial extent R and axial extent A.

As shown in FIGS. 4C and 4D, a radial support device 158 may also be provided in the form of a plurality of balls 160 evenly spaced around the circumference of piston assembly 140. The plurality of balls 160 may each be effectively secured in position by a respective annular ball seat 162 formed at the inner end of a passage 164 extending through flux ring 144. Each ball 160 is formed with a larger diameter than the diameter of the corresponding aperture 164 causing each ball 160 to seat firmly against annular ball seat 162 while extending into aperture 164 sufficiently to prevent axial movement of ball 160. The relative diameters of aperture 164 and ball 160 are designed such that the projection of ball 160 from aperture 164 approximately equals the predetermined radial width of annular flow gap 146 to permit balls 160 to effectively support flux ring 144 and maintain the radial width of the annular flow gap 146. FIG. 5 discloses an alternative embodiment of the radial support device of FIG. 4D wherein an annular groove 166 is formed in the outer surface of piston core 142 to further secure each ball 160. The smooth rounded outer surface of balls 160 promote laminar flow and decrease turbulent flow through flow gap 146 thereby maintaining effective damping. In another embodiment, balls 160 may be staked in the end of flow gap 146. It should be noted that the axial length of the piston assembly is minimized by the positioning of connectors 148 and balls 160 within the axial extent of the flux ring.

FIGS. 6A and 6B disclose another embodiment of the MR damper of the present invention including a piston assembly 200 including a piston core 202, a flux ring 204 positioned on core 202 to form a flow gap 206 and a plurality of connectors 208 in the form of rivets 210 spaced around the circumference of flow gap 206 to secure flux ring 204 concentrically around core 202. Each of the rivets 210 is positioned so that a longitudinal axis of each rivet extends axially along the piston assembly. As shown in FIG. 6B, each rivet 210 extends axially completely through the axial extent of flow gap 206 and includes a rivet head 212 positioned at each end of flow gap 206 to secure the components together without increasing the axial extent of the assembly. Rivets 210 are preferably formed of a non-magnetic material.

Figure 8:
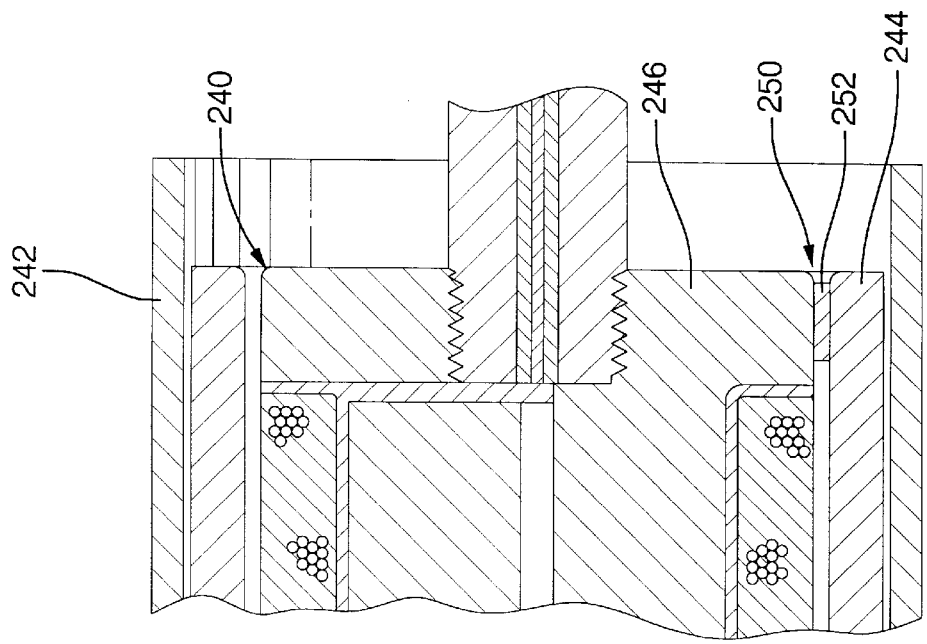
FIG. 8A is a rod-end view of the damper of the present invention showing an alternative embodiment of the radial support device of the present invention.
FIG. 8B is a partial cross sectional view of the damper of FIG. 8A taken along plane 8B—8B.
Figure 8:
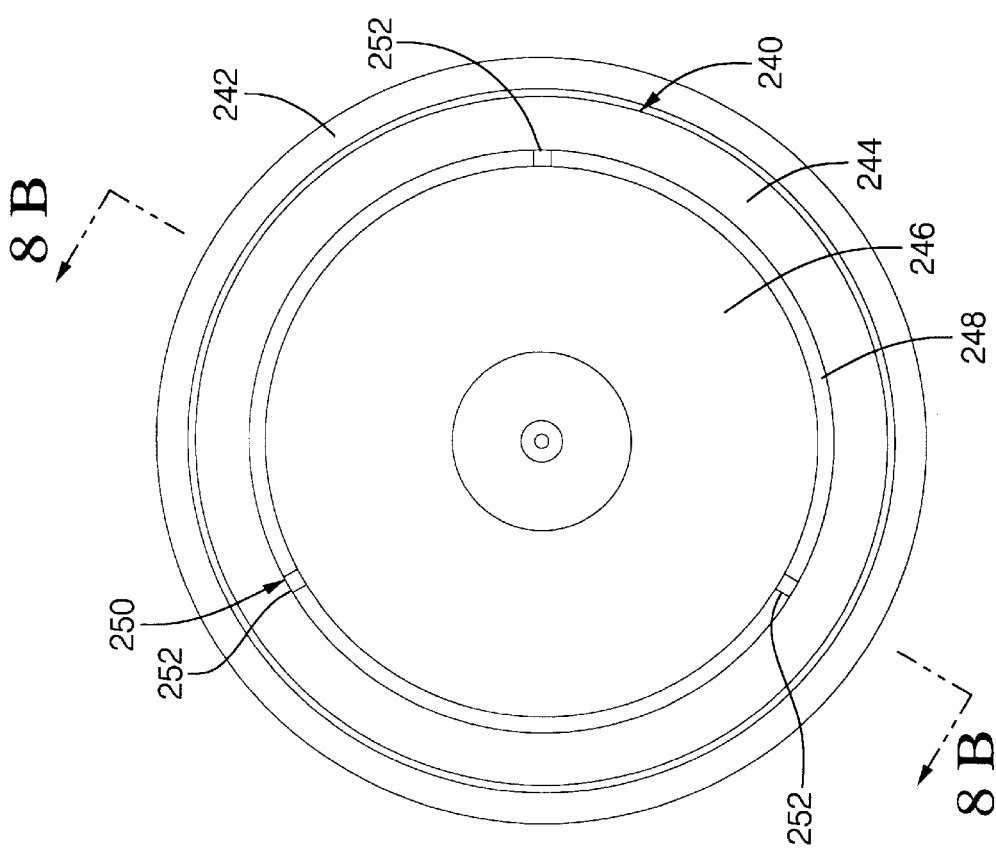

Referring now to FIGS. 7A and 7B, there is shown yet another embodiment of the MR damper of the present invention including a piston assembly 220 positioned for reciprocal movement in a cylinder 222 and including a flux ring 224 positioned concentrically around a piston core 226 to form a flow gap 228. Importantly, piston assembly 220 also includes a plurality of connectors 230 spaced around the circumference of flow gap 228 and positioned within the axial extent of piston assembly 222. Each connector includes an elongated pin 232 extending radially between piston core 226 through annular gap 228 into flux ring 224. Specifically, each of the plurality of connectors 230 also includes a spacer tube 234 positioned in a bore 236 formed in the outer surface of piston core 226. Spacer tube 234 is designed with a predetermined length so that when fully positioned in bore 236, an outer radial end of spacer tube 234 abuts the inner annular surface of flux ring 224. Elongated pin 232 is positioned within spacer tube 234 and extends radially outward into an opposing bore 238 formed in flux ring 224. Thus, elongated pin 232 functions to prevent relative axial movement between piston core 226 and flux ring 224 while spacer tube 234 maintains the concentric positioning of the components to maintain the radial width of flow gap 228. The cylindrical outer surface of spacer tube 234 enhances laminar flow through flow gap 228 thereby maintaining effective damping. It should be noted that the plurality of connectors 230 may be used at either end of the piston assembly and further may be used in combination with any one or more of the radial support devices disclosed herein, for example, with the plurality of connectors 230 positioned at one and the desired radial support positioned at an opposite end to provide enhanced radial support along the entire axial length of the piston assembly. As shown in FIGS. 8A and 8B, another embodiment of the MR damper of the present invention is illustrated which includes a piston assembly 240 mounted for reciprocal movement in cylinder 242 and including a flux ring 244 concentrically mounted on a piston core 246 to form flow gap 248. Importantly, piston assembly 240 includes a radial support device comprised of elongated pins 252 evenly spaced around the circumference of flow gap 248 for providing radial support to flux ring 244 so as to maintain the concentric positioning of flux ring 244 and piston core 246 and the desired radial width of flow gap 248. Each elongated pin 252 may be welded or brazed to the outer surface of piston core 246 and designed with a radial width sufficient to create a close fit between flux ring 244 and the outer surface of elongated pins 252. Each elongated pin 252 is formed with a relatively small circumferential extent much less than the longitudinal or axial extent as shown in FIG. 8B. Consequently, elongated pins 252 do not significantly impede the flow of fluid through flow gap 248 but still provide the desired radial support. Preferably, each elongated pin 252 is formed with a rectangular cross section. Radial support device 250 may be used in combination with any of the connection devices disclosed herein for axially retaining the flux ring on the piston core, such as connector device 36 of FIGS. 1A–1C wherein elongated pins 252 would be used instead of rivets 55. Therefore, although FIG. 8B discloses the elongated pins 252 positioned at the rod-end of the piston assembly 240, the elongated pins may be used at the opposite end of the piston assembly.

Figure 9:
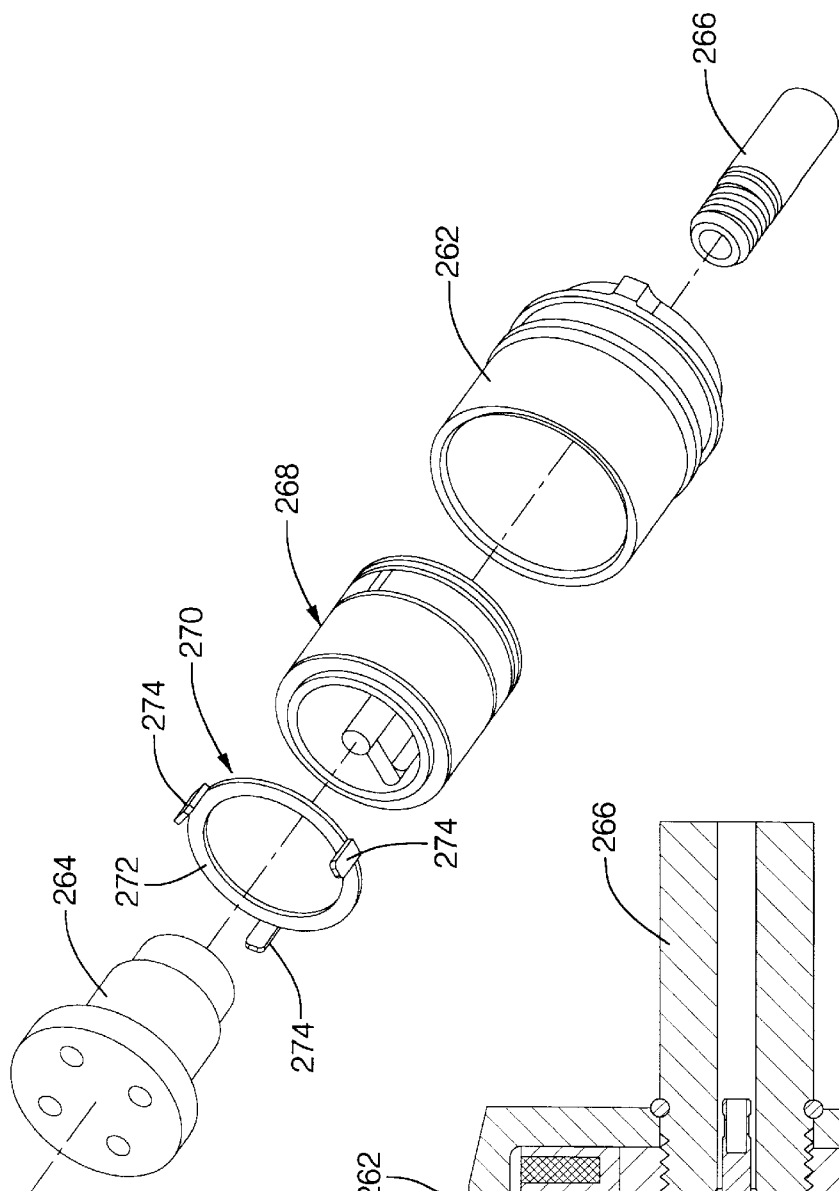
FIG. 9A is an exploded perspective view of yet another embodiment of the piston assembly of the present invention including a washer type radial support device.
FIG. 9B is a cross sectional view of an assembled piston assembly of FIG. 9A.
Figure 9:
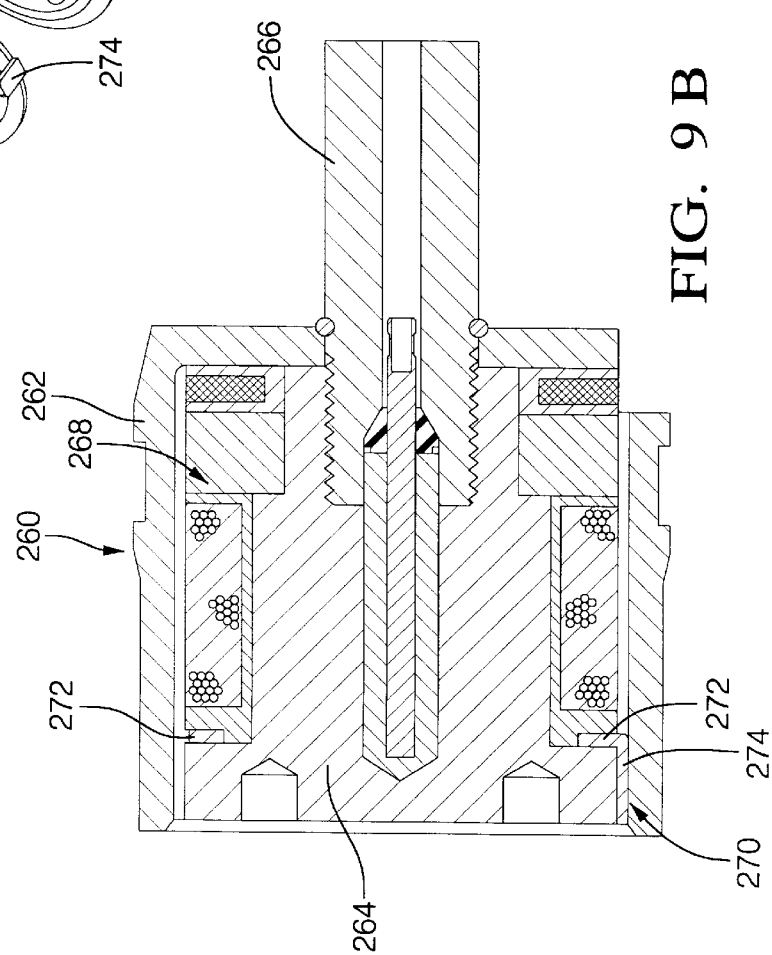

FIGS. 9A and 9B disclose yet another embodiment of the MR damper of the present invention including a piston assembly 260 comprised of a flux ring 262 mounted on a piston core 264 and connected to a rod 266. A coil and pole piece assembly 268 is also mounted on piston core 264. Importantly, the piston assembly 260 of the present embodiment includes a radial support device 270 comprised of a washer 272 secured between piston core 264 and the coil and pole piece assembly 268. Washer 272 includes several tabs 274 evenly spaced around the circumference of washer 272 and extending axially from the outer annular edge of washer 272. As shown in FIG. 9B, tabs 274 extend axially through the annular gap forming a close fit between piston core 264 and flux ring 262. As a result, radial support device 270 prevents concentric misalignment between piston core 264 and flux ring 262 at least at one end of piston assembly 260 without extending the length of the piston assembly. Again, washer 272 may be used in combination with any connector device disclosed herein for connecting a flux ring to a piston core.

It should be apparent that the connector devices disclosed herein for both axially and radially securing a flux ring to a piston core, and the radial support devices for providing radial support/alignment, may be used in various combinations and at various locations on the piston assembly. For example, washer 272, tabs 128, balls 160, rivets 55 or 58 and/or elongated pins 252 may be used in combination with connector device 36 of FIGS. 1A–1C, the connector piece 114 of FIGS. 3A–3C, the plurality of connectors 148, i.e. flat blades 150, of FIGS. 4A–4B or the plurality of connectors 230, i.e. elongated pins 232 and spacer tube 234, of FIGS. 7A–7B.

What is claimed is:

1. A damper, comprising:
a cylinder containing a magnetorheological fluid;
a piston assembly mounted for reciprocal movement in said cylinder to form a first chamber positioned on one side of said piston assembly and a second chamber positioned on an opposite side of said piston assembly, said piston assembly including a piston core, a magnet assembly adapted to generate a magnetic field and including a flux ring, and an annular flow gap extending axially between said first and said second chambers and positioned radially between said piston core and said flux ring;
a connector means positioned adjacent one end of said piston assembly for securing said flux ring said piston core to prevent relative radial and axial movement between said flux ring and said piston core; and
a radial support means positioned a spaced axial distance along said piston assembly from said connector means for maintaining said annular flow gap by radially supporting said flux ring, said radial support means including:
(a) a plurality of balls positioned in said flow gap,
(b) a plurality of ball seats formed on one of said flux ring and said piston core, each of said plurality of ball seats sized to engage a respective ball and prevent axial movement of said respective ball, and
(c) an aperture formed in said flux ring, said respective ball seat formed at one end of said aperture.

* * * * *